March 5, 1957   M. J. KELLY   2,784,389
INFORMATION STORAGE UNIT
Filed Dec. 31, 1954

INVENTOR.
MARTIN J. KELLY
BY
ATTORNEY

United States Patent Office 2,784,389
Patented Mar. 5, 1957

2,784,389

INFORMATION STORAGE UNIT

Martin J. Kelly, Endicott, N. Y., assignor to International Business Machines Corporation, New York, N. Y., a corporation of New York Application December 31, 1954, Serial No. 479,178

6 Claims. (Cl. 340—173)

This invention is concerned with an electrical storage device. More specifically, it concerns a simple storage device for use in an electric system, which device employs two conductors separated by a dielectric.

In information storage in electrical and electronic devices there have been various drawbacks, such as the necessity for regenerating a stored signal in order to maintain it in a state that will produce a read-out signal when the information is required. Or, where magnetic storage is employed, there is a lot of expensive equipment and material necessary, such as the various coils and the special magnetic core material, etc. Whereas with a storage unit according to this invention, there is only a very simple mechanism which needs no auxiliary equipment.

Consequently it is an object of this invention to provide a storage unit, for information to be electrically stored, which provides an impedance path having a given value when information is stored that differs substantially from the value when information is not stored. Such path will remain in this state indefinitely until the reading out of the information is accomplished.

Another object of this invention is to provide a simple, yet reliable, storage device for electrically storing information in the form of a changed impedance path, which was changed from a high impedance path prior to the storage of the information to a low impedance path subsequent thereto, or vice versa. The device will remain in such condition for an indefinite period of time.

Briefly, the invention is concerned with a method of storing information in an electric circuit which comprises the steps of applying a relatively high voltage to a circuit including a pair of conductors separated by a dielectric, and also the step of forming a conductive bridge across said dielectric. In addition, the invention includes a method of reading stored information in the form of a conductive bridge connecting two conductors separated by a dielectric which comprises the application of a relatively low voltage across said two conductors, determining the presence of the low resistance path formed by said bridge, and breaking said bridge to leave a high resistance path between the two conductors. Also, the invention contemplates the provision of an electrical information storage unit which comprises a pair of conductors separated by a dielectric, and includes means for causing a breakdown in said dielectric and for forming a conductive bridge thereacross, and means for determining the presence of said conductive bridge for repairing said dielectric in order to read out the stored information. In this manner there is an indication that a bridge was there while the bridge is removed for reuse of the storage unit.

Some specific embodiments of the invention are described below and illustrated in the drawings, in which.

It is proposed by this invention to regulate the application of a predetermined quantity of electrical energy to a pair of conductors that are separated by a dielectric, in order to bridge the dielectric gap such that a conductive circuit is formed. Then the presence of such a bridge will act as a stored bit of information, which may be determined at any time thereafter, by passing a signal between the pair of conductors and consequently across the bridge. The reverse is true, of course, i. e. the storage of information may be by the absence of a bridge rather than by the presence of one. The read out of information may be done with or without the removal of the presence of the stored information.

It will be appreciated by anyone skilled in the art that there may be many ways of accomplishing the desired information storage and read-out as well as many applications therefor, depending to a great extent upon the materials used for the pair of conductors, as well as that employed as a dielectric. Consequently, although specific illustrations are used to describe this invention, it is to be understood that many other circuits and different materials might be employed in carrying out the invention.

Figure 1:
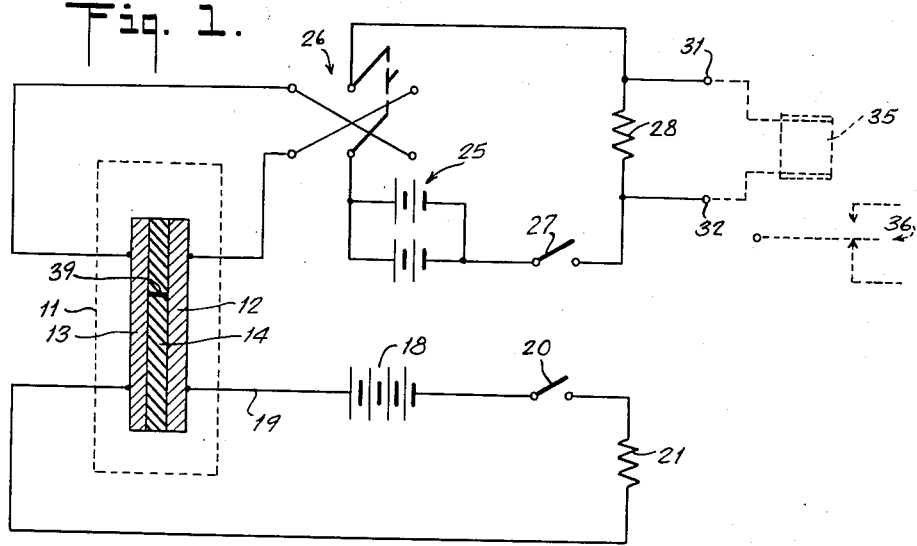
Fig. 1 is a schematic circuit diagram illustrating one means of making use of a storage unit according to this invention.

A basic illustration of an embodiment for the invention is shown in Fig. 1, and deals with conductors such as plates of various metals. The dielectric employed will best be the oxide of the metal of one or both of the plates.

Referring to Fig. 1, there is shown a storage unit 11 which includes a pair of metallic plates 12 and 13 (shown in cross-section) that are separated by a dielectric material 14. These plates may both be the same material or they may be different materials, so long as they are relatively good conductors. It will be appreciated that the thickness of the dielectric layer 14 is not to scale but is greatly exaggerated for purposes of explanation. It is contemplated that this structure may be set up by taking either the plate 12, or the plate 13, and oxidizing one surface thereof to form the dielectric 14. Then the unit is assembled by juxtaposing the two plates 12 and 13 in intimate contact with one another, having the dielectric layer 14 therebetween.

For introducing a read-in pulse, i. e. in order to set up the presence of a bit of information, there is shown a D. C. voltage source 18. Source 18 is illustrated as being a battery, but may, of course, be any source of electrical energy. One plate, or electrode 12, is connected directly to one side of D. C. source 18 by a wire 19. The other side of D. C. source 18 is connected in series with a switch 20 and a resistor 21 to the other plate or electrode 13 of the storage unit 11.

For reading out the presence or absence of information in the storage unit 11, there is another source of electrical energy 25, that is illustrated as being a pair of batteries in parallel. This illustration is merely for the purpose of indicating the source 25 as having a relatively low voltage, but adequately high current capabilities. One side of the voltage source 25 is connected via a reversing switch 26 to either the electrode 12 or the electrode 13 of the storage unit 11. The other side of read-out voltage source 25 is connected via a switch 27, in series with a resistor 28, and to the other set of contacts on the reversing switch 26, so as to be reversibly connected to the other electrode 12 or 13. There is a pair of read-out signal terminals 31 and 32, that are connected one to each side of the resistor 28. Also, there is shown in dotted lines a relay 35 having a set of contacts 36 to be actuated thereby. The relay 35 is connected to the read-out signal terminals 31 and 32 for energization therefrom.

There is shown in Fig. 1 a storage bridge 39 of conducting material, which connects plate 12 with plate 13. This bridge 39 is located at a random point on the surface between the plates, and extends through the dielectric 14. It is to be noted that by applying a read-in signal, i. e. when switch 20 is closed, the relatively high potential of voltage source 18 is applied across the dielectric 14 between the electrodes 12 and 13. This will cause a breakdown in the dielectric 14 at a random point over the surfaces of the electrodes, and consequent flow of current will heat up the metal or other conducting material at such breakdown point sufficiently to cause it to melt and form a bridge of relatively good conducting material between the two plates 12 and 13.

Then, in order to determine the presence of a bit of information, i. e. the presence of a bridge 39, the switch 27 in the read-out circuit will be closed. This will apply a relatively low voltage across the electrodes 12 and 13, so that current will flow over the bridge 39, which is a low resistance path. The cross-sectional area of bridge 39 is relatively minute, so that the passage of current over the bridge 39 will rapidly cause a heating of the metal in the bridge. Such heating of this bridge will produce a reoxidation of the conducting material, and thus will dissolve or break the bridge. During this action, a read-out pulse in the form illustrated in Fig. 2 will be produced.

Figure 2:
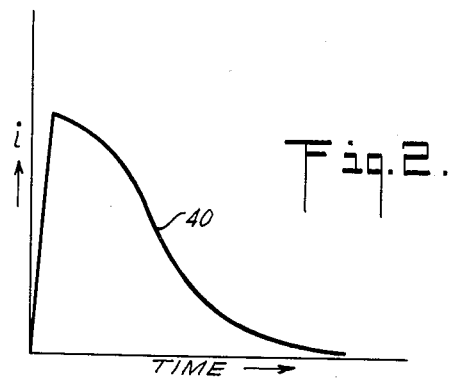
Fig. 2 is a diagram showing a curve illustrating the waveform for a read-out pulse.

It will be observed that in Fig. 2 the current flow is plotted against time, and a curve 40 will result from the action just described above. In other words, the current will rise rapidly to a maximum and then, as the heating of the bridge 39 produces melting and reoxidation of the conducting material therein, the current will fall in a smooth curve as shown by curve 40 down to a low value as determined by the high resistance of the dielectric 14. Such read-out pulse will be produced across the resistor 28 (and consequently at the read-out terminals 31 and 32) where the presence of this pulse may be determined by any feasible means.

It is contemplated that by employing the proper circuit constants in this system a relay 35 may have its coil directly connected to read-out terminals 31 and 32, as is illustrated by the dotted line showing of relay 35, and consequently the presence of a read-out signal or pulse will cause an actuation of the contacts 36 of relay 35. Thus, an indication of the presence of a bit of information previously stored, may be transmitted to an increased power circuit (not shown) as may be desired.

The exact details of the action which takes place during the formation and dissolving of a storage bridge are not known. However, one theory as to the action is that when the dielectric is punctured by the necessary energy (read-in signal), the boiling point of the metal of the electrodes is reached at the point of rupture. Because of this, a solid bridge of metal, of which at least one of the conductors is made, is formed between the two conductors or electrodes. Then when the repair voltage, i. e. the read-out signal voltage, is applied to the electrodes, current flows through the bridge. This bridge has a very small cross-sectional area, and consequently the current density in the bridge becomes quite high and the metal is heated and again reaches a high temperature. This time, however, it is believed that the temperature remains below the boiling point because the metal in the bridge is quickly oxidized at the elevated temperature and such oxidation produces a dissolution of the bridge and a repair of the rupture which formed the bridge.

It is contemplated that the storage unit 11 may be located in some particular atmosphere, e. g. oxygen, in order to gain particular desired effects. For example, more rapid breaking or healing of the storage bridge 39 may be effected with the unit in an atmosphere of oxygen. Also, the life of the unit may be prolonged should the oxygen adjacent to the dielectric 14 tend to become dissipated with use.

Also, it will be noted that while simple switches 20 and 27 have been illustrated in the read-in and read-out circuits, switches of a more complex nature may be employed, for example, vacuum tubes or transistors or the like.

Reversing switch 26 is employed to effect a reversal of current flow through the storage bridge 39, so that the most efficacious direction of current flow may be employed in reading out a bit of stored information, regardless of the direction of current flow used in the read-in, or formation of the bridge.

It is to be noted that although the storage unit is described as being constructed of aluminum electrodes with a film of aluminum oxide as a dielectric, many other metals might be employed. Furthermore, the dielectric may be the oxide of a different metal from the electrodes, or even be some other dielectric material than a metallic oxide.

Separate circuits for the read-in and the read-out signals need not necessarily be used. This is particularly true since different voltage levels are not necessary for the two signals.

Figure 3:
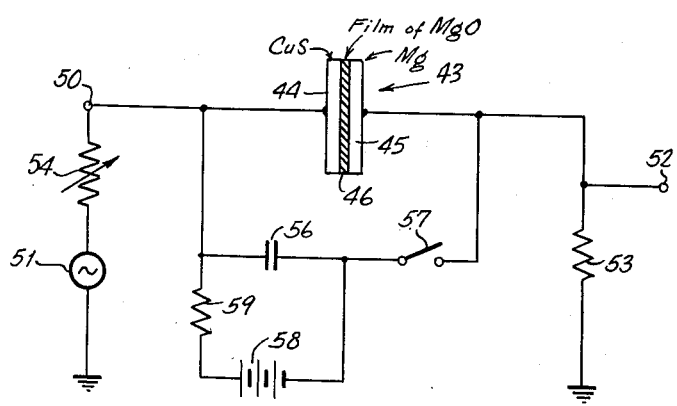
Fig. 3 is a schematic circuit diagram illustrating an embodiment of the invention.

Fig. 3 illustrates a specific embodiment of the invention that may be employed as a storage unit for a bit of information. This embodiment emphasizes the fact that the information storage may be had in either way with respect to a given condition, i. e. the presence or absence of a state of conductivity may be a stored bit of information.

In Fig. 3 there is illustrated a storage unit 43 that is composed of electrodes of two different conductive materials as indicated. An electrode 44 may take any convenient shape and is composed of cupric sulfide (Cu S). Since this material is not stable, some care should be taken for its protection from the atmosphere.

Another electrode 45 is composed of magnesium that has been anodized to form a thin layer of magnesium oxide (Mg O) on the surface thereof. Thus a dielectric layer 46 is located between the two electrodes 44 and 45. The electrodes are held in intimate contact by any convenient means (not shown) so as to maintain an equal spacing and to gain desired uniformity of results.

A circuit for making use of the unit according to Fig. 3 is illustrated, and includes an input terminal 50, to which is connected a source 51 of alternating current. There is a variable resistor 54 to adjust the amplitude of A. C. input signals applied at the input terminal 50. The other side of A. C. source 51 is grounded to make a complete circuit for the input signals. The circuit of the storage unit also includes an output terminal 52 that is connected to one side of an output resistor 53, the other side of which resistor is grounded. The terminals 50 and 52 are connected directly to the electrodes 44 and 45 respectively. There is a read-in or storage circuit including a condenser 56 that has one side connected directly to the electrode 44. The other side of the condenser 56 is connected to a switch 57 that determines the closing of a discharge circuit for the condenser since the other side of the switch 57 is directly connected to the electrode 45. There is a source of D. C. voltage 58 which has a resistor 59 in series therewith and which are both permanently connected across the condenser 56 for charging the same.

The operation of this circuit is as follows: Beginning with the unit 43 in a state of non-conductivity for either direction of current flow, i. e. after a certain amplitude input signal has been applied to input terminal 50 from A. C. source 51 which input signal had greater than a predetermined amplitude, a bit of information may be stored by closing the switch 57 which will allow the condenser 56 to discharge across the dielectric 46 between the electrodes 44 and 45. Following this storage, an A. C. signal of less than the certain amplitude may be applied at the input terminal 50 and a rectified output signal will be had at the output terminal 52. Then whenever the presence of the information is to be removed, the amplitude of the A. C. input signal will be raised to cause a return to a state of high resistance to both directions of current flow. It will be noted that there are two conditions that exist between the electrodes 44 and 45. One is when the dielectric layer 46 acts as a semi-conductor, and the second is when the dielectric layer 46 acts as a non-conductor. It will be appreciated that which of these two conditions exists may be readily determined by noting the characteristics of the output signal at the terminal 52 during the application of an input signal (A. C.) to the terminal 50. Of course, the input signal must be below the above mentioned critical amplitude or the first state (semi-conductor) cannot continue to exist. Thus, the discharge of the condenser 56 across the dielecetric 46 will create the first condition where it did not already exist, and the raising of the amplitude of the A. C. input signal above a predetermined amplitude will create the second condition whenever it did not already exist. Naturally, the determination at the output, as to which condition exists must be made with an input A. C. signal below the critical amplitude.

It will be clear that when a state of conductivity exists in the unit 43 it is unidirectional only. However, many uses for this type storage unit are possible, and it will be clear to one skilled in the art that the reverse conditions from those described above may be employed to indicate the presence of a stored bit of information. For example, beginning with a state of conducitvity for one direction of flow between electrodes 44 and 45, information may be stored by applying a signal having an amplitude above a given amount. This renders the unit 43 non-conducting both directions, and it remains in this state until the condenser 56 is discharged through the unit.

Preferred values for a specific unit according to the system as shown in Fig. 3, to give most satisfactory operation, are the following: An A. C. input voltage of fifteen volts or more causes breakdown of the unidirectional conductivity across dielectric 46, and the discharge of a five microfarad condenser 56 that was charged to one hundred and fifty volts causes repair which renders the dielectric conductive in the one direction again. The direction of conductivity is from the cupric sulfide plate 44 to the magnesium plate 45, and the discharge current from the condenser 56 must also be in this direction.

It will be appreciated by one skilled in the art that a storage device according to this invention may be employed in many different types of circuits, and may have various means for introducing the read-in and read-out pulses of energy that will cause the storage and removal of the condition representing a bit of information in the storage unit. Therefore, while the invention has been described in considerable detail for certain embodiments thereof, in accordance with the applicable statutes, this is not to be taken as in any way limiting the invention but merely as being descriptive thereof.

It is claimed:

1. An electrical information storage unit comprising a plurality of conductors separated by a dielectric, means for causing a breakdown in said dielectric to form a conductive bridge thereacross, and electrical means for rapidly repairing said dielectric after read-out of the stored information.

2. The method of reading stored information in the form of a conductive bridge connecting a plurality of conductors separated by a dielectric comprising the application of sufficient electrical energy across said dielectric to form a conductive bridge thereacross, determining the presence of said conductive bridge, and electrically removing said bridge to leave a high resistance path between the two conductors.

3. An electrical information storage unit comprising a pair of conductors in physical contact with one another, a dielectric on the surface of one of said conductors, means for applying a relatively high voltage across said conductors to form a conductive bridge therebetween, and means for applying a relatively low voltage across said conductors to determine the presence or absence of a conductive bridge therebetween.

4. An electrical unit for permanently storing information in the form of the presence or absence of a state of conductivity comprising a plurality of conductive materials separated by dielectric material, first circuit means for applying electrical energy to change the state of the unit, and second circuit means for applying electrical energy to return the state of the unit to that originally held.

5. An electrical unit for permanently storing information comprising a pair of electrodes separated by a dielectric, one of said electrodes being cupric sulfide, the other of said electrodes being magnesium and said dielectric being magnesium oxide, first circuit means for applying an A. C. potential to said electrodes including an output terminal for determining the state of conductivity of said unit, and second circuit means for applying a D. C. pulse to said electrodes for causing said unit to become conductive.

6. An electrical unit for removably storing permanent information in the form of the presence or absence of a state of conductivity comprising an electrode of cupric sulfide, an electrode of magnesium, a dielectric of magnesium oxide separating said electrodes, first circuit means for applying a D. C. potential to said electrodes to render said dielectric conductive in one direction, second circuit means for applying an A. C. potential to said electrodes to render said dielectric non-conductive in either direction, and output circuit means for determining the state of conductivity or non-conductivity of said dielectric in order to read the presence or absence of a bit of information.

References Cited in the file of this patent
UNITED STATES PATENTS

| | | |
|---|---|---|
| 1,915,984 | Dowling | June 27, 1933 |
| 2,237,802 | Wittke | Apr. 8, 1941 |
| 2,688,739 | Hofgaard | Sept. 7, 1954 |